Patented July 25, 1950

2,516,412

UNITED STATES PATENT OFFICE 2,516,412

METHOD OF SYNTHESIZING SYRINGALDEHYDE

Irwin A. Pearl, Appleton, Wis., assignor, by mesne assignments, to Sulphite Products Corporation, a corporation of Wisconsin No Drawing. Application July 5, 1946,
Serial No. 681,600

7 Claims. (Cl. 260—600)

My invention relates to the production of syringaldehyde. It has been found that this compound, and particularly certain derivatives thereof, especially the derived monocarboxylic acid and various esters, have interesting and valuable optical, chemical and germicidal properties, but development in this field is greatly hampered because, from a commercial point of view, the parent substance is available only in almost negligible quantities and even then at almost prohibitive prices.

Syringaldehyde, having the structure

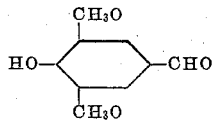

was first isolated in 1888 by Korner [Gazz. chim. ital. 18, 210 (1888)] by the decomposition with the aid of sulfuric acid or emulsion of glucosyringaldehyde which in turn was prepared by the cautious oxidation with dilute chromic acid of syringin, a glucoside isolated from the bark of *Syringa vulgaris* L. (Lilac) and *Ligustrum vulgare* L. (Privet), Oleaceae. Since that time a large number of experimenters have tried to make syringaldehyde synthetically and several methods have been suggested. However all of these methods result in only small yields, if any at all, of the desired syringaldehyde. Graebe and Martz [Ber. 36, 1031 (1903)] obtained small amounts of syringaldehyde by the Reimer-Tiemann reaction in which pyrogallol 1,3-dimethyl ether was condensed with chloroform in the presence of alkali. Later Buoyt [Compt. Rend. 149, 788 (1909)], Gry [Bull Soc. Chim. (4) 7, 592 (1910)] and Mauthner [Ann. 395, 273 (1912)], succeeded in condensing pyrogallol 1,3-dimethyl ether with diethyl mesoxalate to yield diethyl 2 - (4 - hydroxy-3,5-dimethoxyphenyl) tartronate which was saponified to syringoyl formic acid which in turn, upon heating, lost one molecule of water to yield the desired aldehyde. More recently Pauly and Strassburger [Ber. 62, 2277 (1929)] condensed pyrogallol 1,3-dimethyl ether with anhydrous chloral to yield 4 - hydroxy - 3,5 - dimethoxy-α,α,α-trichlorobenzyl alcohol which was hydrolyzed to 4-hydroxy-3,5-dimethoxyphenyl hydroxyacetic acid. This acid was oxidized to syringoyl formic acid which in turn was heated to yield syringaldehyde. Very recently Manske, Ledingham and Holmes [Can. J. Res. 23B 100 (1945)] obtained a small yield of syringaldehyde by the procedure of Duff (J. Chem. Soc. 1941, 547) in which pyrogallol 1,3-dimethyl ether was heated with glycerine borate and hexamethylene-tetramine to a high temperature. Syringaldehyde has also been synthesized from syringic acid derivatives. Späth [Monatsh. 41, 278 (1920)] reduced syringonitrile acetate and hydrolyzed the resultant imine to the aldehyde.

All of the above methods are drawn out and laborious, and in addition to giving very poor over all yields, they could not be used on even a large laboratory scale. In fact, when a substantial amount of syringaldehyde was needed for synthetic work recourse had to be taken to oxidation of lignin with alkali and nitrobenzene and separation of the syringaldehyde from the other aldehydes present by the method of Hibbert and co-workers [J. Am. Chem. Soc. 61, 2198 (1939)].

I have discovered that syringaldehyde can be manufactured in good yield and on a large scale from 1,3 - dimethoxy-2-hydroxy-benzene, which is obtained in the distillate of beechwood tar or is obtained in good yields by the controlled methylation of pyrogallol, a widely used chemical of commerce. The following series of reactions illustrate the preparation of syringaldehyde from pyrogallol.

EXAMPLE I

*Preparation of 1,3-dimethoxy-2-hydroxybenzene*

[See Krauss and Crede, J. Am. Chem. Soc. 39, 1433 (1917)]

A flask containing 126 parts of pyrogallol is connected to a reflux condenser. Methyl bromide is passed into the flask by a glass tube ending in a capillary and passing through the condenser to near the bottom of the flask until the air is displaced. A solution of sodium methylate (prepared by dissolving 57.5 parts of sodium in 640 parts of absolute methanol) is run into the flask together with a continuous stream of methyl bromide. The flask is heated on the water bath and the current of methyl bromide continued until the reaction is nearly neutral. The gas is rapidly absorbed and sodium bromide separates. The 1,3-dimethoxy-2-hydroxybenzene is isolated as follows: Water is added until the sodium bromide dissolves. The methanol is evaporated, and the residue is distilled with steam. Any 1,2,3-trimethoxybenzene present passes over in the steam. The residue is acidified and extracted with ether. The ether solution is evaporated and the resulting oil fractionated under reduced pressure. The pure 1,3-dimethoxy-2-hydroxybenbene is obtained as white crystals melting at 55–56° C.

EXAMPLE II
2-allyloxy-1,3-dimethoxybenzene

A mixture of 154 parts of 1,3-dimethoxy-2-hydroxybenzene, 133 parts of allyl bromide and 180 parts of anhydrous potassium carbonate in 400 parts of dry acetone was heated to boiling under reflux with occasional shaking for eight hours. The solvent was removed by distillation, and the residue was diluted with water and extracted with ether. The ether was washed with dilute sodium hydroxide solution, then with water, dried with calcium chloride and distilled under reduced pressure on the steam bath to remove ether and excess allyl bromide. The residual liquid was distilled under high vacuum and was obtained as an almost colorless oil distilling at 102°/2 mm. and 130°/9 mm. The index of refraction was $n_D^{22}$ 1.5300. The yield of 2-allyloxy-1,3-dimethoxybenzene was 184 parts or 95%.

EXAMPLE III
3,5-dimethoxy-4-hydroxyallylbenzene 2-allyloxy-1,3-dimethoxybenzene (104 parts) was boiled under reflux at 75 mm. pressure for one hour and was then distilled under high vacuum. 3,5-dimethoxy-4-hydroxyallylbenzene distilled as a colorless oil boiling at 123–125°/2 mm. $n_D^{21}$ 1.5478. The yield was 147 parts or 90%.

EXAMPLE IV
3,5-dimethoxy-4-hydroxypropenylbenzene, as a salt

A mixture of 100 parts of 3,5-dimethoxy-4-hydroxyallylbenzene, 50 parts of potassium hydroxide and 200 parts of water was placed in a flask connected to a distillation assembly and heated to boiling. The clear solution soon became thick with precipitate. When the temperature reached 110° C. it had set to almost a solid. At this point 450 parts of aniline were added and the mixture distilled again. After about 100 parts of distillate were collected the solution became very thick with precipitate. This precipitate disappeared when the last bit of water was removed and the temperature began to rise. About 150 parts of distillate had been collected at this point. The distillation was continued until approximately 100 parts of aniline were collected and the temperature of boiling was 178–180° C. The hot mixture was allowed to cool and a mixture of aniline and the potassium salt of 3,5-dimethoxy-4-hydroxypropenylbenzene solidified.

EXAMPLE V
3,5-dimethoxy-4-hydroxypropenylbenzene

The solid mass from Example IV was dissolved in water and extracted with ether. The alkaline aqueous layer was acidified with dilute hydrochloric acid. The oil which separated was extracted with ether and the ether solution was washed with dilute hydrochloric acid, then with water, and then dried. The ether was removed by distillation and the residual oil was distilled under high vacuum to give 93 parts of 3,5-dimethoxy-4-hydroxypropenylbenzene to an almost colorless oil boiling at 107–8°/0.05 mm. $n_D^{27}$ 1.5741.

EXAMPLE VI
Syringaldehyde from alkali metal salt (3,5-dimethoxy-4-hydroxybenzaldehyde)

The solidified mixture of the potassium salt of 3,5-dimethoxy-4-hydroxypropenyl benzene and aniline obtained when the hot (178–180° C.) mixture of Example IV was cooled was covered with 300 parts of nitrobenzene and 100 parts of 1:1 sodium hydroxide solution. The resulting mixture was heated to 100–105° C. with stirring for two hours, allowed to cool and diluted with water. The solution was extracted with ether and the aqueous layer was acidified. The acid mixture was extracted with ether and the ether was extracted with 21% sodium bisulfite solution. The bisulfite solution was acidified with sulfuric acid and aspirated to remove dissolved sulfur dioxide. Crystalline syringaldehyde separated and was filtered and washed with water. Ether extraction of the filtrate and washings yielded more syringaldehyde. The total yield of crude syringaldehyde melting at 109–110° C. was 78 parts or 84%. Recrystallization from ligroin raised the melting point to 110–111° C.

EXAMPLE VII
Syringaldehyde from the isolated intermediate

Syringaldehyde may also be prepared by oxidizing the isolated 3,5-dimethoxy-4-hydroxypropenyl benzene of Example V with nitrobenzene and alkali or other low potential oxidizing agents. Thus 195 parts 3,5-dimethoxy-4-hydroxypropenylbenzene are added to a cupric oxide mixture freshly prepared from 1000 parts hydrated copper sulfate, 600 parts sodium hydroxide, and 3000 parts of water and the resulting mixture is heated to boiling under reflux for eight hours. The separated red cuprous oxide is filtered and washed with water. The alkaline filtrate and washings are acidified and extracted with ether. Bisulfite purification of the ether extract should yield approximately 165 parts or 90% syringaldehyde.

Other alkaline copper oxidizing agents such as Fehlings Solution, Benedict's Solution, etc., may be used with the same results.

An alkaline copper oxidizing agent is particularly advantageous for replacing the propenyl group with the aldehyde group because the strength of its action in changing from a cupric to a cuprous compound is definitely adequate to oxidize to the aldehyde, and at the same time insufficient to continue the oxidation to the acid form or to destruction. However, in large scale operation, it will be obvious that oxidizing agents having no such automatic action may be employed for reasons of economy, and the extent of the reaction controlled by controlling the amount of the reagent.

In quantity production it will also be advantageous under most conditions to combine the procedures of Examples IV and VI into substantially a single process by simply letting the hot material in Example IV cool to the right temperature for the next reaction and adding the additional reagents for the reaction of Example VI. The reaction of Example II proceeds equally well in an organic solvent which is itself alkaline, such as pyridine, aniline, dimethylaniline, etc.

Others may readily adapt the invention for use under various conditions of service by employing one or more of the novel features disclosed, or the equivalents thereof. As at present advised with respect to the apparent scope of my invention, I desire to claim the following subject matter.

I claim:

1. Method of producing synthetic syringaldehyde, which comprises: (1) isomerizing 3,5-dimethoxy-4-hydroxyallylbenzene by heating in strong alkali to produce 3,5-dimethoxy-4-hydroxypropenylbenzene; (2) oxidizing the product of step 1 by heating with an oxidizing agent in aqueous alkali to produce syringaldehyde.

2. Method according to claim 1 in which the oxidation is performed on an alkaline salt of 3,5-dimethoxy-4-hydroxypropenylbenzene.

3. Method according to claim 1 in which the oxidation is performed with an alkaline copper oxidizing agent.

4. Method according to claim 1 in which the oxidation is performed with nitrobenzene.

5. As a new compound useful in the synthesis of syringaldehyde, the compound 3,5-dimethoxy-4-hydroxypropenylbenzene, having the formula:

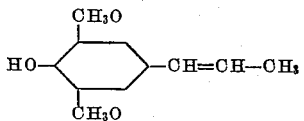

6. In the synthesis of syringaldehyde, the steps of (1) reacting 3,5-dimethoxy-4-hydroxyallylbenzene with alkali in a mixture of water and aniline to transform it to 3,5-dimethoxy-4-hydroxypropenylbenzene and (2) reacting the 3,5-dimethoxy-4-hydroxypropenylbenzene with nitrobenzene in the presence of alkali to transform the propenyl group to the aldehyde group; the second step being performed as a continuation of said first step by adding the second reagent to the mass in which the first step takes place, as by heating the mass to complete the first transformation and subsequently adding the nitrobenzene.

7. In the synthesis of syringaldehyde, the steps of (1) reacting 3,5-dimethoxy-4-hydroxyallylbenzene with alkali in a mixture of water and aniline to transform it to 3,5-dimethoxy-4-hydroxypropenyl benzene and (2) reacting the 3,5-dimethoxy-4-hydroxypropenylbenzene with nitrobenzene in the presence of alkali to transform the propenyl group to the aldehyde group.

IRWIN A. PEARL.

REFERENCES CITED

The following references are of record in the file of this patent:

UNITED STATES PATENTS

| Number | Name | Date |
| --- | --- | --- |
| 1,643,804 | Bots | Sept. 27, 1927 |

OTHER REFERENCES

Ber. Deut. Chem., vol. II (1878), page 334, 1 page.

Annalen, vol. 414 (1918), pages 250–255, 6 pages.

Pearl, "J. Am. Chem. Soc.," vol. 64 (1942), pages 1429–1431, 3 pages.

Karrer, "Organic Chemistry," Nordeman Publ. Co., 1938, pages 395–398.

Lucas, "Organic Chemistry," Amer. Book Co., 1935, page 439.